(12) United States Patent
Yang et al.

(10) Patent No.: US 8,989,022 B2
(45) Date of Patent: Mar. 24, 2015

(54) METHOD FOR ALLOCATING CONTROL CHANNEL AND DEVICE THEREFOR

(75) Inventors: Suckchel Yang, Anyang-si (KR); Mingyu Kim, Anyang-si (KR); Joonkui Ahn, Anyang-si (KR); Dongyoun Seo, Anyang-si (KR)

(73) Assignee: LG Electronics Inc., Seoul (KR)

( * ) Notice: Subject to any disclaimer, the term of this patent is extended or adjusted under 35 U.S.C. 154(b) by 168 days.

(21) Appl. No.: 13/704,919

(22) PCT Filed: Jun. 16, 2011

(86) PCT No.: PCT/KR2011/004420
§ 371 (c)(1),
(2), (4) Date: Dec. 17, 2012

(87) PCT Pub. No.: WO2011/159111
PCT Pub. Date: Dec. 22, 2011

(65) Prior Publication Data
US 2013/0088973 A1    Apr. 11, 2013

Related U.S. Application Data

(60) Provisional application No. 61/355,543, filed on Jun. 16, 2010, provisional application No. 61/357,067, filed on Jun. 21, 2010, provisional application No. 61/367,856, filed on Jul. 26, 2010, provisional application No. 61/372,841, filed on Aug. 11, 2010.

(51) Int. Cl.
*G01R 31/08* (2006.01)
*G06F 11/00* (2006.01)
(Continued)

(52) U.S. Cl.
CPC ............. *H04W 72/042* (2013.01); *H04L 5/003* (2013.01); *H04L 5/0044* (2013.01); *H04L 5/0053* (2013.01); *H04W 72/0406* (2013.01);
(Continued)

(58) Field of Classification Search
CPC ..... H04L 5/003; H04L 5/0044; H04L 5/0053; H04L 5/0007; H04J 11/00; H04W 72/0406; H04W 72/042; H04B 7/26
See application file for complete search history.

(56) References Cited

U.S. PATENT DOCUMENTS

2007/0230600 A1   10/2007   Bertrand et al.
2009/0215499 A1   8/2009    Moon et al.
(Continued)

FOREIGN PATENT DOCUMENTS

JP    2009-542040 A    11/2009
KR    10-2009-0034610 A    4/2009
(Continued)

*Primary Examiner* — Jae Y Lee
(74) *Attorney, Agent, or Firm* — Birch, Stewart, Kolasch & Birch, LLP

(57) ABSTRACT

The present invention relates to a wireless communication system. More particularly, the present invention relates to a method for allowing a terminal to receive a PDCCH in a wireless communication system using multiple carriers and a device therefore, and the method comprises the steps of: receiving a plurality of search spaces through a control region on a subframe, wherein each search space includes a plurality of PDCCH candidate sets, and each search space corresponds to each carrier; and monitoring PDCCH candidates for the PDCCH, wherein the intervals between the respective search spaces within said control region are determined by considering the ratios between the number of scheduled carriers and the number of CCEs within the control region.

2 Claims, 13 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04W 72/04* (2009.01)
*H04L 5/00* (2006.01)
*H04B 7/26* (2006.01)
*H04J 11/00* (2006.01)

(52) U.S. Cl.
CPC ................. *H04B 7/26* (2013.01); *H04J 11/00* (2013.01); *H04L 5/0007* (2013.01)

USPC .......................................................... 370/241

(56) References Cited

U.S. PATENT DOCUMENTS

2009/0257366 A1   10/2009   Power et al.
2011/0194525 A1*  8/2011    Nishio et al. ................. 370/329

FOREIGN PATENT DOCUMENTS

KR  10-2009-0087043 A    8/2009
KR  10-2009-0089767 A    8/2009
WO  WO 2009/045080 A2   4/2009

* cited by examiner

FIG. 12
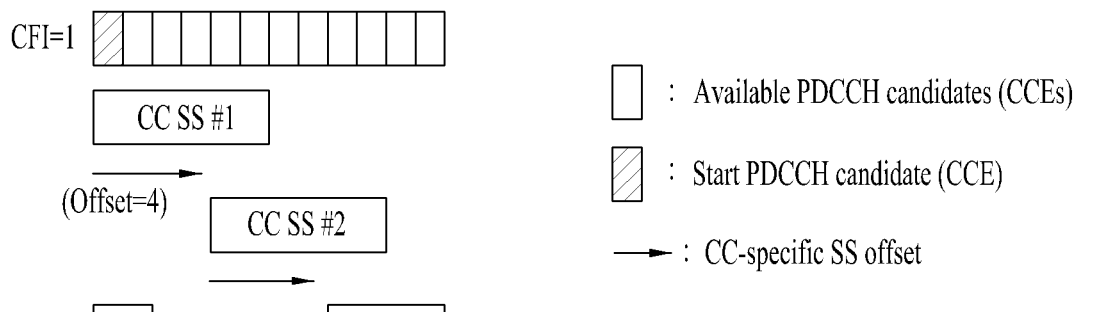
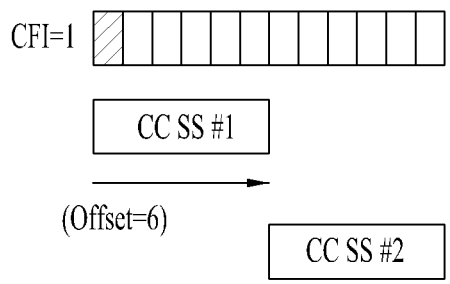

METHOD FOR ALLOCATING CONTROL CHANNEL AND DEVICE THEREFOR

CROSS-REFERENCE TO RELATED APPLICATIONS

This application is the National Phase of PCT/KR2011/004420 filed on Jun. 16, 2011, which claims priority under 35 U.S.C. 119(e) to U.S. Provisional Application No. 61/355,543 filed on Jun. 16, 2010; U.S. Provisional Application No. 61/357,067 filed on Jun. 21, 2010; U.S. Provisional Application No. 61/367,856 filed on Jul. 26, 2010 and U.S. Provisional Application No. 61/372,841 filed on Aug. 11, 2010, all of which are hereby expressly incorporated by reference into the present application.

TECHNICAL FIELD

The present invention relates to a wireless communication system, and more particularly to a method and apparatus for allocating a control channel.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, and the like.

DISCLOSURE

Technical Problem

Accordingly, the present invention is directed to a method and apparatus for allocating a control channel. An object of the present invention is to provide a method and apparatus for efficiently allocating a control channel in a wireless communication system supporting carrier aggregation (CA). Another object of the present invention is to provide a method and apparatus for overcoming blocking capable of being generated in control channel allocation. Another object of the present invention is to provide a method and apparatus for constructing a search space to efficiently transmit a control channel.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

The object of the present invention can be achieved by providing a method for receiving a physical downlink control channel (PDCCH) by a user equipment (UE) in a wireless communication system supporting multiple carriers, the method including: receiving a plurality of search spaces through a control region of a subframe, wherein each search space includes a plurality of PDCCH candidate sets and corresponds to each carrier; and monitoring PDCCH candidates for the PDCCH, wherein a spacing between the search spaces within the control region is determined in consideration of a ratio of the number of control channel elements (CCEs) contained in the control region to the number of scheduled carriers.

In another aspect of the present invention, a user equipment (UE) configured to receive a physical downlink control channel (PDCCH) in a wireless communication system supporting multiple carriers includes a radio frequency (RF) unit; and a processor which receives a plurality of search spaces through a control region of a subframe, and monitors PDCCH candidates for the PDCCH. Each search space includes a plurality of PDCCH candidate sets and corresponds to each carrier, and a spacing between the search spaces within the control region is determined in consideration of a ratio of the number of control channel elements (CCEs) contained in the control region to the number of scheduled carriers.

The position of each search space within the control region may be determined using the sum of a reference point and an offset of the corresponding search space, wherein each offset is determined in consideration of the ratio of the number of CCEs to the number of scheduled carriers.

A CCE index corresponding to a PDCCH candidate (m) within each search space may be determined by the following equation:

$$L \cdot \{(Y_k + O_{c,k}^{(L)} + m) \bmod \lfloor N_{CCE,k}/L \rfloor\} + i \quad \text{[Equation]}$$

where L is a CCE aggregation level, $Y_k$ is the reference point at a subframe (k), $O_{c,k}^{(L)}$ is an offset for a scheduled carrier (c) at a subframe (k) and a CCE aggregation level (L), m is denoted by m=0, ..., $M^{(L)}-1$, $M^{(L)}$ is the number of PDCCH candidates to be monitored in the corresponding search space, $N_{CCE,k}$ is the number of CCEs contained in a control region of the subframe (k), and i is denoted by i=0, ..., L-1.

The value of $O_{c,k}^{(L)}$ may be represented by the following equation:

$$O_{c,k}^{(L)} = c \cdot \lfloor N_{CCE,k}/(L \cdot N_{sch-CC}) \rfloor \quad \text{[Equation]}$$

where c is denoted by c=0, ..., $N_{sch-CC}-1$, $N_{sch-CC}$ is the number of scheduled carriers, and $\lfloor \ \rfloor$ is a floor function.

The value of $O_{c,k}^{(L)}$ may be represented by the following equation:

$$O_{c,k}^{(L)} = c \cdot \min(2, \lfloor N_{CCE,k}/(8 \cdot N_{sch-CC}) \rfloor) \cdot 8/L \quad \text{[Equation]}$$

where c is denoted by c=0, ..., $N_{sch-CC}-1$, $N_{sch-CC}$ is the number of scheduled carriers, $\lfloor \ \rfloor$ is a floor function, and min(A,B) is a smaller of A and B.

Advantageous Effects

As is apparent from the above description, exemplary embodiments of the present invention have the following effects. A control channel can be efficiently allocated in a wireless communication system supporting carrier aggregation. The embodiments of the present invention can overcome blocking capable of being generated when a control channel is allocated. The embodiments of the present invention can efficiently construct a search space.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIGS. 11 and 12 illustrate CC-specific SS configuration according to one embodiment of the present invention.

BEST MODE

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following embodiments of the present invention can be applied to a variety of wireless access technologies, such as Universal Terrestrial Radio Access (UTRA) or CDMA2000. TDMA can be implemented by wireless communication technologies, for example, a Global System for Mobile communications (GSM), a General Packet Radio Service (GPRS), an Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of a Universal Mobile Telecommunications System (UMTS). 3rd Generation Partnership Project (3GPP) Long Term Evolution (LTE) is a part of an Evolved UMTS (E-UMTS) that uses an E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
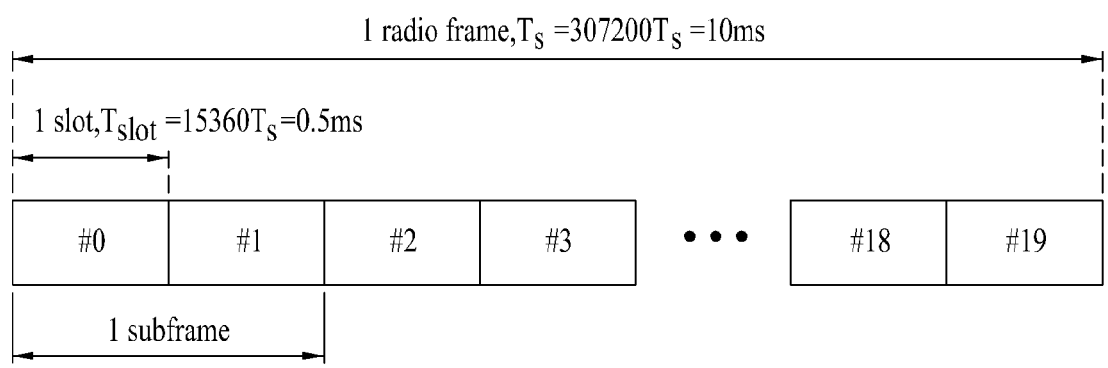
FIG. 1 exemplarily shows a radio frame structure for use in a 3rd Generation Partnership Project (3GPP) system FIG. 2 exemplarily shows a resource grid of a downlink (DL) slot.

FIG. 1 exemplarily shows a radio frame structure for use in a 3rd Generation Partnership Project (3GPP) system.

Referring to FIG. 1, a radio frame includes 10 subframes, and one subframe includes two slots in a time domain. A time required for transmitting one subframe is defined as a Transmission Time Interval (TTI). For example, one subframe may have a length of 1 ms and one slot may have a length of 0.5 ms. One slot may include a plurality of Orthogonal Frequency Division Multiplexing (OFDM) symbols or a Single Carrier Frequency Division Multiple Access (SC-FDMA) symbol in a time domain. Since the LTE system uses OFDMA in downlink and uses SC-FDMA in uplink, the OFDM or SC-FDMA symbol indicates one symbol duration. A resource block (RB) is a resource allocation unit and includes a plurality of contiguous carriers in one slot. The structure of the radio frame is only exemplary. Accordingly, the number of subframes included in the radio frame, the number of slots included in the subframe or the number of symbols included in the slot may be changed in various manners.

Figure 2:
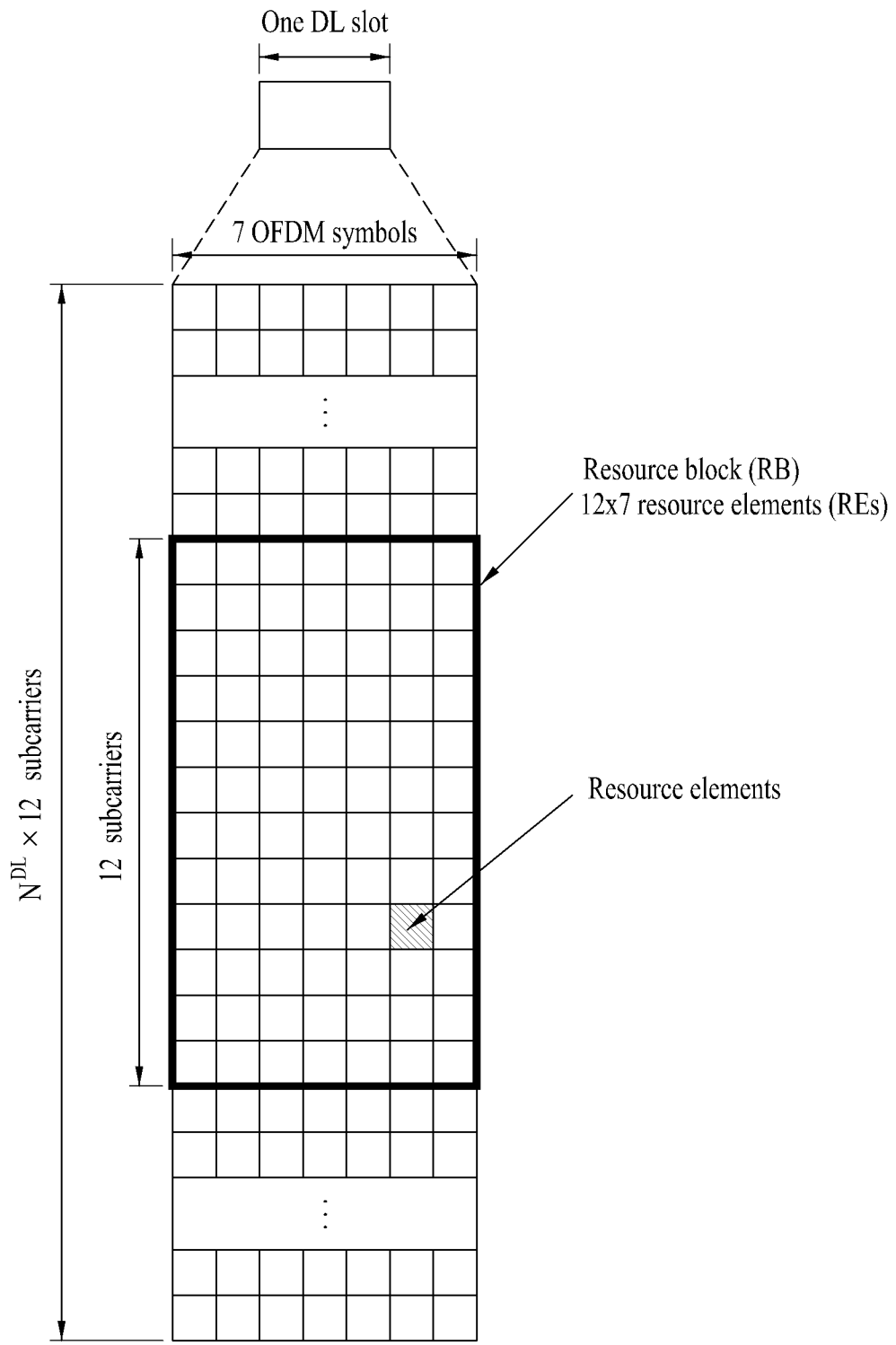

FIG. 2 exemplarily shows a resource grid of a downlink slot.

Referring to FIG. 2, a downlink slot includes 7 (or 6) OFDM symbols and a resource block (RB) includes 12 subcarriers in a frequency domain. Each element on a resource grid may be defined as a resource element (RE). One RB includes 12×7 (or 12×6) REs. The number ($N^{DL}$) of RBs contained in a downlink slot is dependent upon a downlink transmission bandwidth. An uplink slot structure is identical to the downlink slot structure, but OFDM symbols are replaced with SC-FDMA symbols in the uplink slot structure differently from the downlink slot structure.

Figure 3:
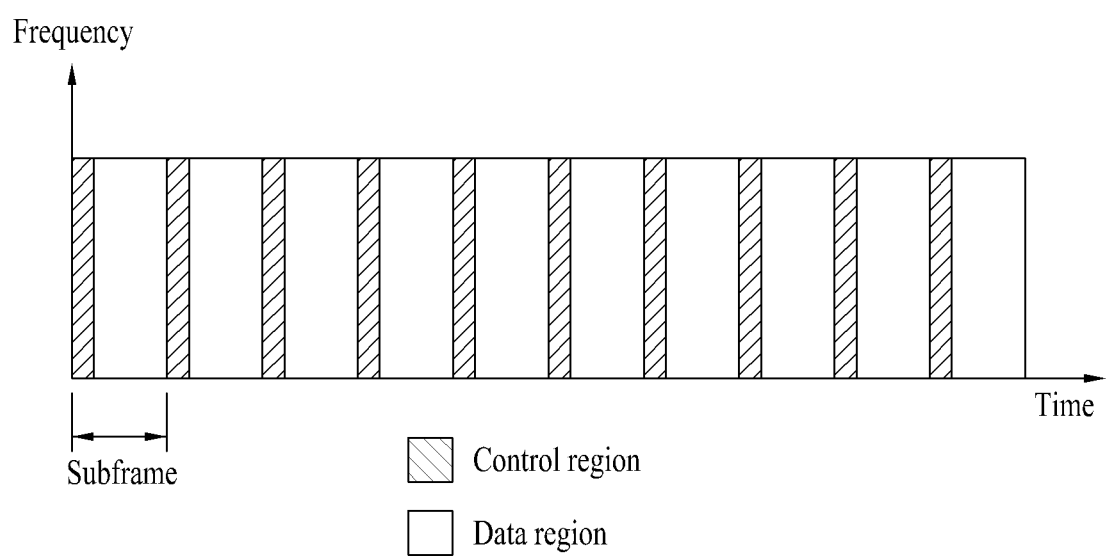
FIG. 3 exemplarily shows a downlink (DL) frame structure.

FIG. 3 is a downlink subframe structure.

Referring to FIG. 3, a maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE, for example, a Physical Control Format Indicator Channel (PCFICH), a Physical Downlink Control Channel (PDCCH), a Physical hybrid ARQ indicator Channel (PHICH), etc. PCFICH is transmitted from a first OFDM symbol of the subframe, and carries information about the number of OFDM symbols used for transmitting a control channel within the subframe. PHICH carries a Hybrid Automatic Repeat request acknowledgment/negative-acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes uplink/downlink (UL/DL) scheduling information, an uplink transmission (UL Tx) power control command, etc.

PDCCH carries a variety of information, for example, transmission format and resource allocation information of a downlink shared channel (DL-SCH), transmission format and resource allocation information of an uplink shared channel (UL-SCH), paging information transmitted over a paging channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A user equipment (UE) can monitor a plurality of PDCCHs. PDCCH is transmitted as an aggregate of one or more contiguous control channel elements (CCEs). CCE is a logical allocation unit that is used to provide a coding rate based on a radio channel state to a PDCCH. CCE may correspond to a plurality of resource element groups (REGs). The format of PDCCH and the number of PDCCH bits may be determined according to the number of CCEs. A base station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, an identifier of the corresponding UE (e.g., cell-RNTI (C-RNTI)) may be masked with the CRC. If PDCCH is provided for a paging message, a paging identifier (e.g., paging-RNTI (P-RNTI)) may be masked with a CRC. If PDCCH is provided for system information (e.g., system information block (SIC)), CRC may be masked with system information RNTI (SI-RNTI). If PDCCH is provided for a random access response, CRC may be masked with random access-RNTI (RA-RNTI). For example, CRC masking (or scrambling) may be performed using an XOR operation between CRC and RNTI at a bit level.

PDCCH may carry a message known as a DCI. Generally, several PDCCHs may be transmitted in a subframe. Each PDCCH is transmitted using one or more CCEs. One CCE may be mapped to 9 REGs, and one REG may be mapped to four REs. Four QPSK symbols may be mapped to individual REGs. Resource elements occupied by a reference signal (RS) are not contained in an REG. Therefore, the number of REGs for use in a given OFDM symbol is changed according to the presence or absence of a cell-specific reference signal (RS). REG concept may also be applied to other downlink control channels (that is, PDFICH and PHICH). As can be seen from Table 1, four PDCCH formats are supported.

TABLE 1

| PDCCH format | Number of CCEs (n) | Number of REGs | Number of PDCCH bits |
|---|---|---|---|
| 0 | 1 | 9 | 72 |
| 1 | 2 | 18 | 144 |
| 2 | 4 | 36 | 288 |
| 3 | 8 | 72 | 576 |

CCEs are numbered so that the CCEs can be contiguously used. In order to simplify the decoding process, a PDCCH having a format comprised of n CCEs may start from only a CCE having a specific number corresponding to a multiple of n. The number of CCEs used for transmission of a specific PDCCH may be determined by the base station (BS) according to a channel status. For example, in case of a PDCCH for a UE (for example, the UE may neighbor the BS) having a good DL channel, only one CCE can sufficiently satisfy the PDCCH. However, in case of a PDCCH for a UE having a poor channel (for example, the UE may exist in the vicinity of a cell edge), 8 CCEs may be requested to obtain sufficient robustness. In addition, a PDCCH power level may be adjusted in response to a channel status.

In the case of the LTE system, a CCE set in which a PDCCH may be located for each UE may be defined. CCE set in which the UE can discover its own PDCCH will hereinafter be referred to as a PDCCH search space or simply a search space (SS). Each resource through which a PDCCH can be transmitted within a search space (SS) is referred to as a PDCCH candidate. One PDCCH candidate may correspond to 1, 2, 4 or 8 CCEs according to a CCE aggregation level. The base station (BS) transmits an actual PDCCH (DCI) to an arbitrary PDCCH candidate contained in the search space (SS), and the UE monitors the search space to search for a PDCCH (DCI). In more detail, the UE attempts to perform blind decoding (BD) of PDCCH candidates contained in the search space (SS).

In the LTE system, the search spaces (SSs) for respective PDCCH formats may have different sizes. A dedicated (or UE-specific) search space (SS) and a common SS may be defined. The dedicated search space (SS) may be configured for each UE, and all UEs receive information regarding the common SS range. The dedicated or common SS may overlap with a given UE.

The search spaces (SSs) may be configured in small size and may overlap each other, such that it may be impossible for the base station (BS) to search for CCE resources that transmit a PDCCH to all desired UEs within a given subframe. That is, CCE resources have already been allocated to other UEs, because CCE resources for the corresponding UE may no longer be present in a search space of the specific UE (i.e., blocking of CCE resources). In order to minimize the possibility of blocking to be sustained in the next subframe, a UE-specific hopping sequence is applied to the start position of the dedicated search space.

TABLE 2

| PDCCH format | Number of CCEs (n) | Number of candidates in common search space | Number of candidates in dedicated search space |
|---|---|---|---|
| 0 | 1 | — | 6 |
| 1 | 2 | — | 6 |
| 2 | 4 | 4 | 2 |
| 3 | 8 | 2 | 2 |

A detailed description of PDCCH allocation will be given below. In a subframe (k), a control region is composed of a set of CCEs numbered from 0 to $N_{CCE,k}-1$. $N_{CCE,k}$ is a total number of CCEs contained in a control region of the subframe (k). The UE monitors a set of PDCCH candidates for control information at a non-discontinuous reception (non-DRX) subframe.

CCE(s) corresponding to a PDCCH candidate (m) of the search space $S_k^{(L)}$ at an aggregation level L∈{1, 2, 4, 8} are represented by the following equation 1.

$$L \cdot \{(Y_k+m) \bmod \lfloor N_{CCE,k}/L \rfloor\}+i \qquad \text{[Equation 1]}$$

In Equation 1, $Y_k$ is a start point of the search space. $Y_k$ may be changed on a subframe basis according to a hashing function. A detailed description of $Y_k$ will be given later. En Equation 1, i is denoted by i=0, . . . , L−1, and m is denoted by m=0, . . . , $M^{(L)}-1$. $M^{(L)}$ is the number of PDCCH candidates to be monitored in a given search space. The UE monitors one common search space at each of the CCE aggregation levels L=4 and L=8. In addition, the UE monitors one UE-specific search space at each CCE aggregation level (L=1, L=2, L=4 and L=8). The common search space and the UE-specific search space may overlap. DCI format to be monitored by the UE depends on an established transmission mode. Table 3 exemplarily shows the size (CCEs) of the search space, aggregation levels (Ls), and the number of PDCCH candidates.

TABLE 3

| Type | Search space $S_k^{(L)}$ | | The number $M^{(L)}$ of PDCCH candidates |
|---|---|---|---|
| | Aggregation level (L) | Size (CCE) | |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

In the case of the common search space, $Y_k$ is set to 0 at each of aggregation levels L=4 and L=8. In case of the UE-specific search space, $Y_k$ is represented by the following equation 2 in association with the aggregation level (L).

$$Y_k = (A \cdot Y_{k-1}) \bmod D \quad [\text{Equation 2}]$$

In Equation 2, $Y_{-1}$ is denoted by $Y_{-1} = n_{RNTI} \neq 0$, A is denoted by A=39827, D is denoted by D=65537, k is denoted by $k = \lfloor n_s/2 \rfloor$, $n_s$ is a slot number within a radio frame, and $n_{RNTI}$ is an RNTI value.

In order to control calculation load (or operation load) caused by the blind decoding attempt, the UE does not simultaneously search for all defined DCI formats. Generally, the UE always searches for DCI format 0 and DCI format 1A in the dedicated search space. DCI format 0 and DCI format 1A have the same size, and are distinguished from each other by a flag contained in a message. In addition, the UE may further request other DCI formats (i.e., format 1, 1B or 2 according to PDSCH transmission mode established by the base station). The UE searches DCI format 1A and DCI format 1C in the common search space. In addition, the UE may be configured to search for format 3 or 3A. Formats 3/3A have the same size in the same manner as DCI formats 0/1A, and are distinguished from each other according to whether a scrambled CRC is used as another (common) identifier. Transmission modes and DCI format contents to construct the multi-antenna technology (MIMO technology) are as follows.

Transmission Mode
  Transmission Mode 1: Transmission from a single base station antenna port
  Transmission Mode 2: Transmit diversity
  Transmission Mode 3: Open-loop spatial multiplexing
  Transmission Mode 4: Closed-loop spatial multiplexing
  Transmission Mode 5: Multi-user MIMO
  Transmission Mode 6: Closed-loop rank-1 precoding
  Transmission Mode 7: Transmission using UE-specific reference signals
DCI Format
  Format 0: Resource grants for PUSCH transmissions (uplink)
  Format 1: Resource assignments for single codeword PDSCH transmissions (transmission modes 1, 2 and 7)
  Format 1A: Compact signaling of resource assignments for single codeword PDSCH (all modes)
  Format 1B: Compact resource assignments for PDSCH using rank-1 closed loop precoding (mode 6)
  Format 1C: Very compact resource assignments for PDSCH (e.g. paging/broadcast system information)
  Format 1D: Compact resource assignments for PDSCH using multi-user MIMO (mode 5)
  Format 2: Resource assignments for PDSCH for closed-loop MIMO operation (mode 4)
  Format 2A: Resource assignments for PDSCH for open-loop MIMO operation (mode 3)
  Format 3/3A: Power control commands for PUCCH and PUSCH with 2-bit/1-bit power adjustment FIG. 4 is a flowchart illustrating a method for constructing a PDCCH by a base station (BS).

Figure 4:
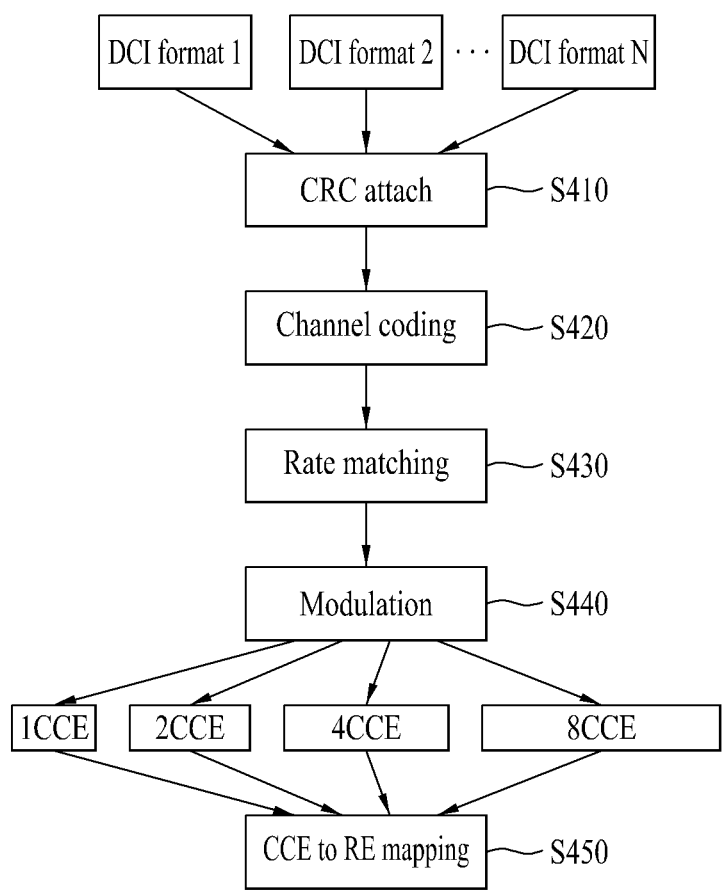
FIG. 4 is a flowchart illustrating a method for constructing a PDCCH by a base station (BS).

Referring to FIG. 4, the base station (BS) generates control information according to DCI format. The base station (BS) may select one of a plurality of DCI formats (i.e., DCI formats 1, 2, . . . , N) according to types of control information to be transmitted to the UE. In step S410, the base station (BS) attaches a cyclic redundancy check (CRC) for error detection to control information that is generated according to each DCI format. The CRC is masked with a Radio Network Temporary Identifier (RNTI) according to an owner or usage of the PDCCH. In other words, the PDCCH is CRC-scrambled with an identifier (e.g., RNTI).

Table 4 shows examples of identifiers masked to the PDCCH.

TABLE 4

| Type | Identifier | Description |
|---|---|---|
| UE-specific | C-RNTI, Temporary C-RNTI, Semi-persistent C-RNTI | Used for a unique UE identification |
| Common | P-RNTI | Used for paging message |
| | SI-RNTI | Used for system information |
| | RA-RNTI | Used for random access response |

If a C-RNTI, a temporary C-RNTI or a semi-persistent C-RNTI is used, the PDCCH carries UE-specific control information and, if another RNTI is used, the PDCCH carries common control information received by all UEs within a cell. In step S420, the control information to which the CRC is attached is subjected to channel coding so as to generate coded data. In step S430, rate matching according to a CCE aggregation level allocated to a PDCCH format is performed. In step S440, the coded data is modulated so as to generate modulated symbols. The modulated symbols configuring one PDCCH may have one of CCE aggregation levels of 1, 2, 4 and 8. In step S450, the modulated symbols (CCEs) are mapped to REs.

Figure 5:
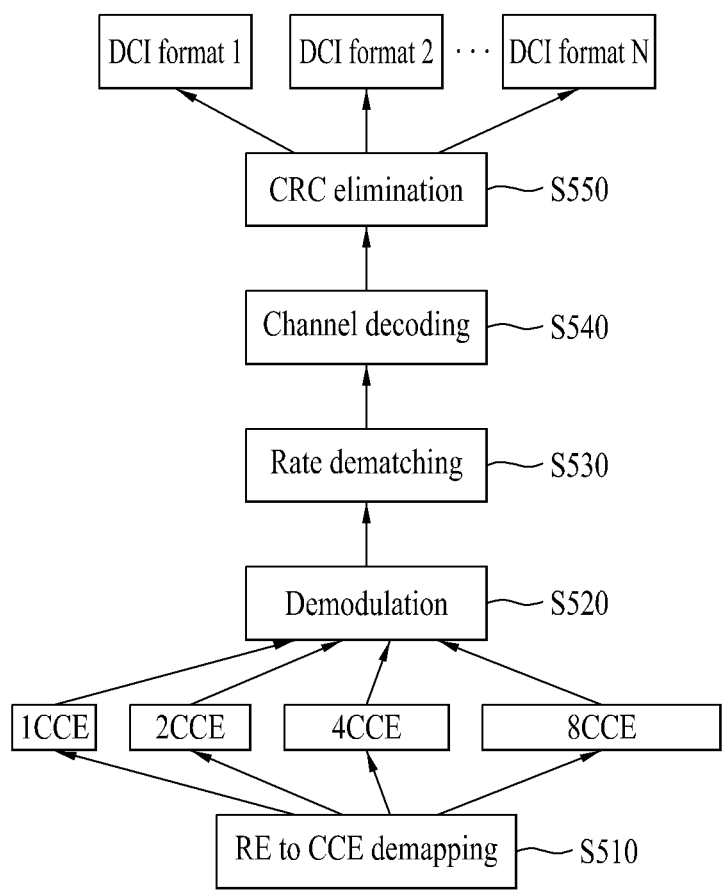
FIG. 5 is a flowchart illustrating a process for receiving a PDCCH by a user equipment (UE).

FIG. 5 is a flowchart illustrating a method of processing a PDCCH at a UE.

Referring to FIG. 5, in step S510, the UE demaps physical REs to CCEs. In step S520, since the UE is not aware of a CCE aggregation level, at which the UE receives a PDCCH, demodulation is performed with respect to the CCE aggregation levels. In step S530, the UE performs rate dematching with respect to the demodulated data. Since the UE is not aware of a DCI format (or a DCI payload size) of control information to be received, rate dematching is performed with respect to each DCI format (or each DCI payload size). In step S540, the data subjected to rate dematching is subjected to channel decoding according to a coding rate and a CRC is checked to detect whether errors occur. If errors do not occur, it is determined that the UE detects a PDCCH thereof. If errors occur, the UE continues to perform BD with respect to other CCE aggregation levels or other DCI formats (or DCI payload sizes). In step S550, the UE which detects the PDCCH removes the CRC from the decoded data and acquires control information.

A plurality of PDCCHs for a plurality of UEs may be transmitted within a control region of the same subframe. The base station (BS) does not provide a UE with information about the position of a PDCCH in the control region. Accordingly, the UE monitors a set of PDCCH candidates and finds a PDCCH thereof. Monitoring refers to attempts to decode the received PDCCH candidates at the UE according to DCI format. This is referred to as blind decoding (blind detection). Through blind decoding, the UE identifies the PDCCH transmitted thereto and, at the same time, decodes the control information transmitted through the PDCCH. For example, in the case in which the PDCCH is demasked with a C-RNTI, the UE may detect the PDCCH when CRC errors do not occur.

In order to reduce overhead of blind decoding, the number of DCI formats is defined to be less than the number of kinds of control information transmitted using the PDCCH. The DCI information includes a plurality of different information fields. The kind of each information field, the number of information fields, the bit number of each information field, etc. are changed according to DCI format. In addition, the size of the control information matching the DCI format is changed according to DCI format. An arbitrary DCI format may be used to transmit two or more kinds of control information.

Table 4 shows an example of control information transmitted in DCI format 0. In the following description, the bit size of each information field is exemplary and is not limited thereto.

TABLE 5

| Information Field | Bit(s) |
| --- | --- |
| (1) Flag for format 0/format 1A differentiation | 1 |
| (2) Hopping flag | 1 |
| (3) Resource block assignment and hopping resource allocation | $\lceil \log_2(N_{RB}^{UL}(N_{RB}^{UL}+1)/2)\rceil$ |
| (4) Modulation and coding scheme and redundancy version | 5 |
| (5) New data indicator | 1 |
| (6) TPC command for scheduled PUSCH | 2 |
| (7) Cyclic Shift for DM RS | 3 |
| (8) UL index (TDD) | 2 |
| (9) CQI request | 1 |

The flag field is an information field for distinguishing between format 0 and format 1A. That is, DCI format 0 and 1A have the same payload size and are distinguished by the flag field. The bit size of the resource block allocation and hopping resource allocation field may be changed according to a hopping PUSCH or a non-hopping PUSCH. The resource block allocation and hopping resource allocation field for the non-hopping PUSCH provides $\lfloor \log_2(N_{RB}^{UL}(N_{RB}^{UL}+1)/2)\rfloor$ bits to resource allocation of a first slot within an uplink subframe. Here, $N_{RN}^{UL}$ is the number of resource blocks included in an uplink slot and depends on an uplink transmission bandwidth set in a cell. Accordingly, the payload size of DCI format 0 may be changed according to uplink bandwidth. DCI format 1A includes an information field for PDSCH allocation and the payload size of DCI format 1A may also be changed according to downlink bandwidth. DCI format 1A provides a reference information bit size for DCI format 0. Accordingly, if the number of information bits of DCI format 0 is less than the number of information bits of DCI format 1A, "0" is added to DCI format 0 until the payload size of DCI format 0 becomes equal to the payload size of DCI format 1A. The added "0" is filled in a padding field of the DCI format.

Figure 6:
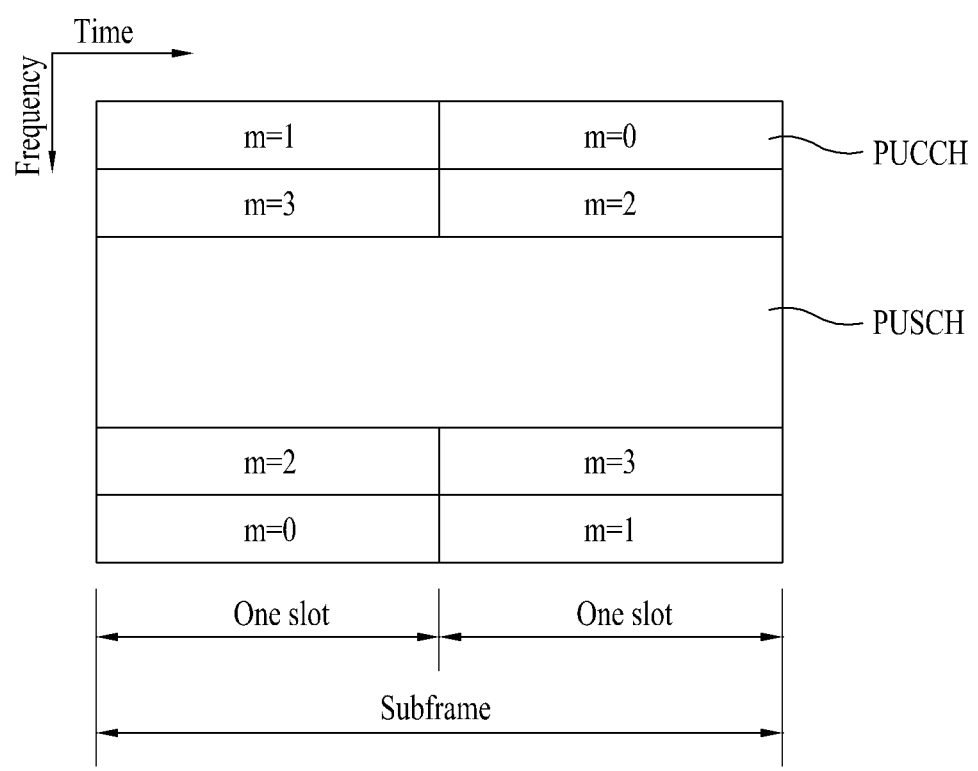
FIG. 6 exemplarily shows an uplink (UL) subframe structure.

FIG. 6 is a diagram showing the structure of an uplink subframe used in LTE.

Referring to FIG. 6, the uplink subframe includes a plurality of slots (e.g., two). The number of SC-FDMA symbols included in one slot may be changed according to the length of a CP. For example, in the case of the normal CP, the slot may include seven SC-FDMA symbols. The uplink subframe is divided into a data region and a control region in a frequency domain. The data region includes a PUSCH and is used to transmit a data signal such as voice data. The control region includes a PUCCH and is used to transmit control information. The PUCCH includes RB pairs (e.g., m=0, 1, 2, 3) located at both ends of the data region on a frequency axis and hops between slots. The control information includes HARQ ACK/NACK, channel quality information (CQI), precoding matrix indicator (PMI), rank indication (RI), etc.

Figure 7:
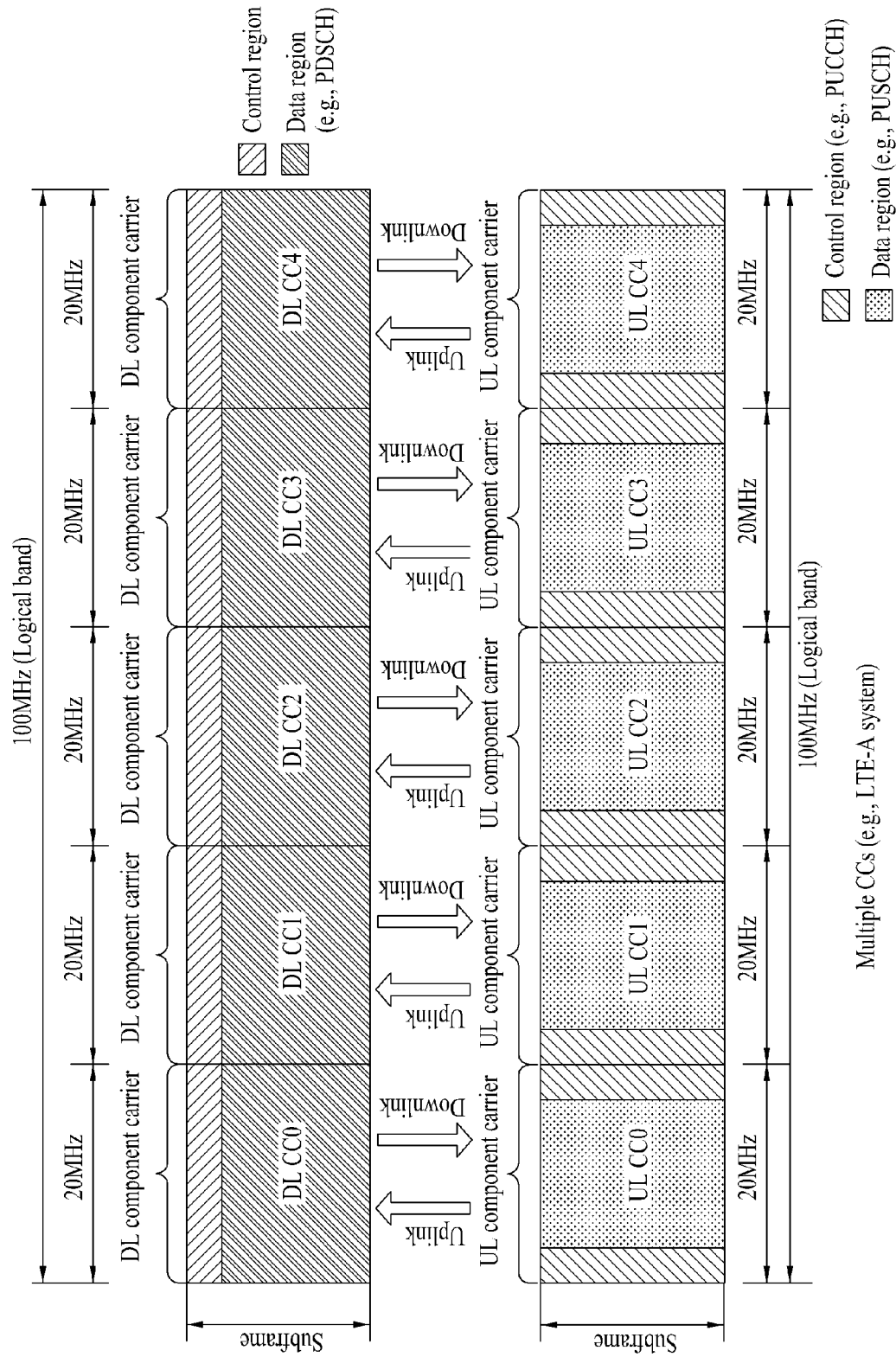
FIG. 7 exemplarily shows a carrier aggregation (CA) communication system.

FIG. 7 is a diagram showing a carrier aggregation (CA) communication system.

Referring to FIG. 7, a plurality of uplink/downlink Component Carriers (CCs) may be aggregated so as to support a wider uplink/downlink bandwidth. The CCs may be contiguous or non-contiguous in a frequency domain. The bandwidths of the CCs are independently set. Asymmetric CA in which the number of UL CCs and the number of DL CCs are different is also possible. The control information may be set to be transmitted/received only through a specific CC. Such a specific CC may be referred to as a primary CC (or anchor CC) and the remaining CCs may be referred to as secondary CCs.

LTE-A uses the concept of a cell so as to manage radio resources. The cell is defined as a combination of DL resources and UL resources. Here, the UL resources are not an essential part. Accordingly, the cell can be configured using DL resources only, or DL resources and UL resources. When carrier aggregation (CA) is supported, the linkage between a carrier frequency (or DL CC) of a DL resource and a carrier frequency (or UL CC) of a UL resource can be designated by system information. A cell operating at a primary frequency (or PCC) can be referred to as a Primary Cell (PCell) and a cell operating at a secondary frequency (or SCC) can be referred to as a Secondary Cell (SCell). The PCell is used for a UE to perform an initial connection establishment procedure or a connection re-establishment procedure. The PCell may refer to a cell designated during a handover procedure. The SCell can be configured after RRC connection is established and used to provide additional radio resources. The PCell and the SCell can be called a serving cell. Accordingly, for a UE that does no support carrier aggregation (CA) while in an RRC_connected state, only one serving cell configured with a PCell exists. Conversely, for a UE that is in an RRC_Connected state and supports carrier aggregation (CA), one or more serving cells including a PCell and a SCells are provided. For carrier aggregation (CA), a network can configure one or more SCells for a UE that supports carrier aggregation (CA) in addition to a PCell initially configured during a connection establishment procedure after an initial security activation procedure.

Therefore, PCC may be used interchangeably with a PCell, a primary (radio) resource, and a primary frequency resource. Similarly, CSS may be used interchangeably with an SCell, a secondary (radio) resource, and a secondary frequency resource.

For example, if cross-carrier scheduling (or cross-CC scheduling) is applied, a PDCCH for downlink allocation may be transmitted through DL CC#0 and a corresponding PDSCH may be transmitted through DL CC#2. For cross-carrier scheduling, a carrier indicator field (CIF) is used. Setting presence/absence of the CIF in the PDCCH may be enabled through higher layer signaling (e.g., RRC signaling) in a semi-static and UE-specific (or UE-group-specific) manner. The basic matters (baselines) of PDCCH transmission are summarized as follows.

CIF disabled: A PDCCH on a DL CC is allocated PDSCH resources on the same DL CC and PUSCH resources on a single linked UL CC.

No CIF

Identical to LTE PDCCH structure (same coding, same CCE-based resource mapping) and DCI format CIF enabled: A PDCCH on a DL CC may be allocated PDSCH or PUSCH resources on one of a plurality of aggregated DL/UL CCs using a CIF.

LTE DCI format extended to have a CIF

CIF (if set) is a fixed x-bit field (e.g., x=3)

The position of the CIF (if set) may be fixed regardless of a DCI format size.

LTE PDCCH structure is reused (same coding, same CCE-based resource mapping)

If the CIF is present, a base station (BS) may allocate a monitoring DL CC set in order to reduce BD complexity of a UE. A PDCCH monitoring DL CC set is a part of all aggregated DL CCs and includes one or more DL CCs, and a UE may detect/decode a PDCCH only in a corresponding DL CC. In other words, if the base station (BS) performs PDSCH/PUSCH scheduling, the PDCCH is transmitted only through the PDCCH monitoring DL CC set. The PDCCH monitoring DL CC set may be set in a UE-specific, UE-group-specific or cell-specific manner. The term "PDCCH monitoring DL CC" (simply, PDCCH CC) may be replaced with equivalent terms such as "monitoring carrier", "monitoring cell", etc. In addition, the term "aggregated CC" for a UE may be replaced with terms such as "serving CC", "serving carrier", "serving cell", etc.

Figure 8:
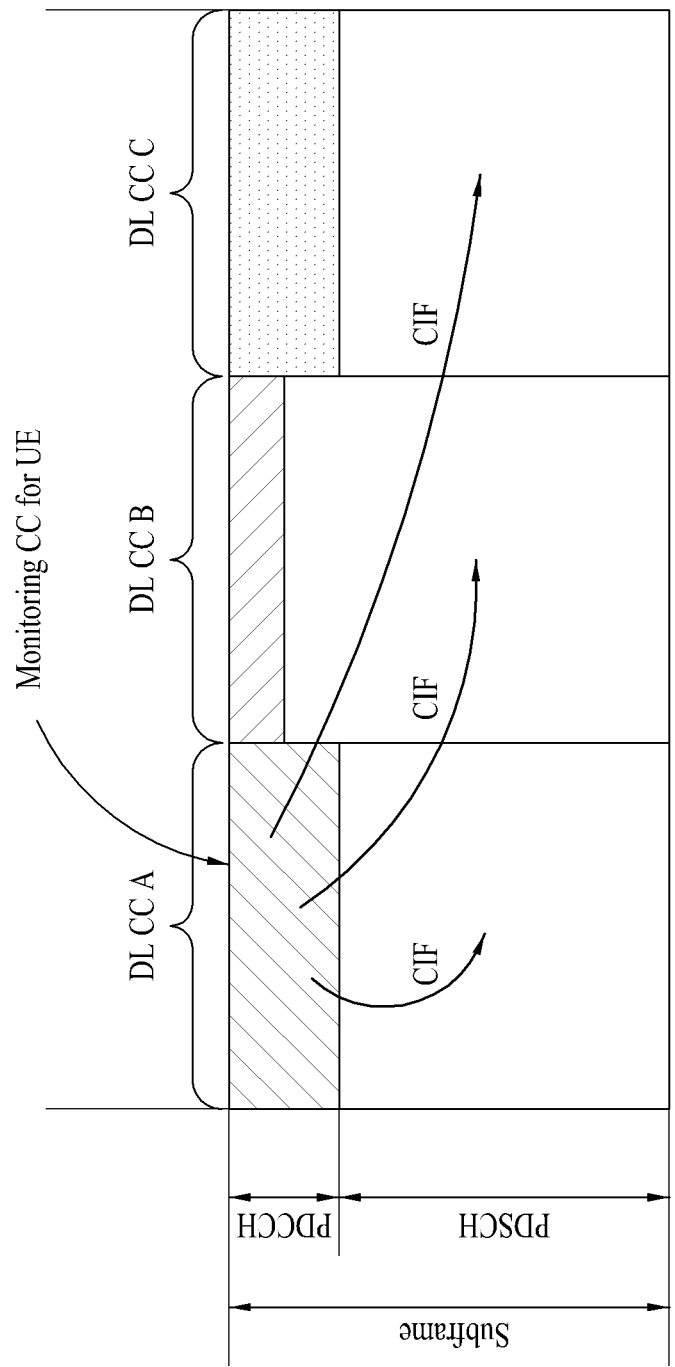
FIG. 8 exemplarily shows scheduling for use in an aggregate of multiple carriers.

FIG. 8 illustrates scheduling when a plurality of carriers is aggregated. It is assumed that 3 DL CCs are aggregated and DL CC A is set to a PDCCH monitoring DL CC. DL CC A, DL CC B and DL CC C may be called serving CCs, serving carriers, serving cells, etc. When the CIF is disabled, each DL CC may transmit only a PDCCH that schedules a PDSCH corresponding to the DL CC without a CIF. When the CIF is enabled according to UE-specific (or UE-group-specific or cell-specific) higher layer signaling, DL CC A (PDCCH CC) may transmit not only a PDCCH that schedules the PDSCH corresponding to the DL CC A but also PDCCHs that schedule PDSCHs of other DL CCs. In this case, no PDCCH is transmitted in DL CC B and DL CC C not established as PDCCH DL CCs. Therefore, DL CC A (PDCCH CC) must include all of a PDCCH search space related to DL CC A, a PDCCH search space related to DL CC B, and a PDCCH search space related to DL CC C.

As described above, LTE-A considers cross-CC scheduling using a CIF under the condition that a plurality of CCs is aggregated, so that a plurality of PDCCHs for a plurality of CCs (i.e., scheduled CCs) can be transmitted through a single DL CC (i.e., PDCCH CC). In this case, the scheduled CC is linked with the corresponding PDCCH CC in terms of scheduling. That is, scheduled CC(s) established in a specific PDCCH CC may refer to CC group(s) capable of being scheduled only through the corresponding PDCCH CC. For this purpose, a UE-specific SS of the corresponding PDCCH CC may be comprised of a plurality of individual CC-specific SSs for each of the scheduled CCs. That is, the PDCCH search space may be defined for each carrier.

Each CC-specific SS may be independently configured with an independent starting CCE index, or multiple CC-specific SSs have one start point and are concatenated without an offset between CCs. However, provided that individual CC-specific SSs are independently configured without any restriction or are concatenated, an overlap between CC-specific SSs is focused on some CC-specific SSs, so that the possibility of blocking may be increased.

Therefore, the present invention provides a method for enabling multiple CC-specific SSs in a PDCCH CC to be concatenated with a specific offset between CC-specific SSs (i.e., CC-offset-SS). In this case, multiple CC-specific SSs may have one start point (i.e., one reference point), and may be concatenated with a specific interval (or specific spacing) between CC-specific SSs. For convenience of description, spacing between CC-specific SSs (e.g., spacing between SS start points) is referred to as an offset between SSs (i.e., an inter-SS offset). In addition, spacing between a CC-specific SS and one start point (i.e., a reference point) is referred to as an SS-specific offset. For convenience of description, the inter-SS offset and the SS-specific offset are generically called an SS offset or an offset. Therefore, unless explicitly stated otherwise, the SS offset (simply, offset) may also be interpreted as an inter-SS offset and/or an SS-specific offset according to context.

Under the condition that multiple CCs are aggregated and cross-carrier scheduling is performed, a method for efficiently allocating a control channel and a method for constructing a search space will hereinafter be described in detail. Prior to the following description, it should be noted that transmission modes for use in aggregated CCs may be established independently of each other, and a bandwidth is allocated to each CC, such that the same or different bandwidths may be used. From among all aggregated CCs for each UE (group), one or more DL CCs may be established as a PDCCH CC for the corresponding UE (group). In addition, similarly to the legacy LTE, the present invention assumes that BD for two DCI formats can be carried out in each PDCCH candidate, but the scope or spirit of the present invention is not limited thereto. If necessary, BD for either at least one DCI format or at least three DCI formats for each PDCCH candidate can be carried out in each PDCCH candidate.

Figure 9:
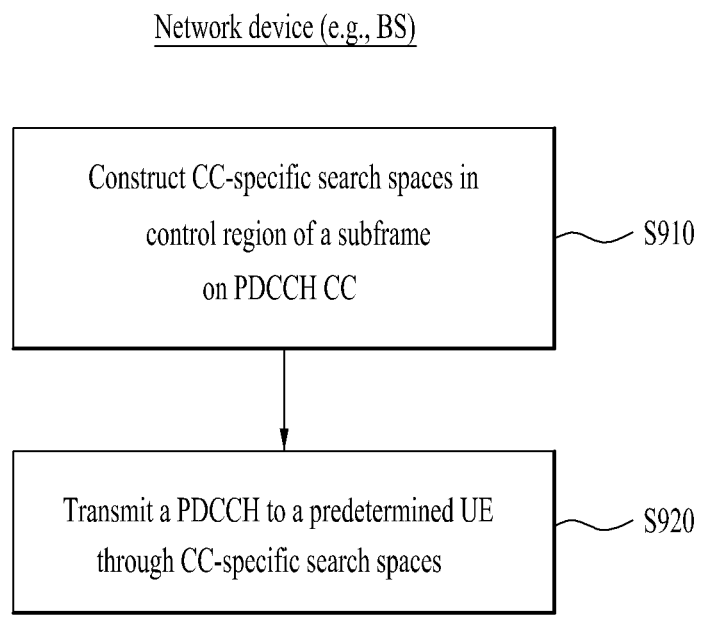
FIG. 9 is a conceptual diagram illustrating a method for transmitting a control channel by a network apparatus (e.g., a base station).

FIG. 9 shows and example in which a network device (e.g., BS or eNB) transmits a control channel.

Referring to FIG. 9, the eNB configures a plurality of CC-specific search spaces (CC-specific SSs) in a control region of a subframe on a PDCCH CC in step S910. In the example of FIG. 9, multiple CC-specific SSs are concatenated with a specific interval (or spacing) therebetween. The specific interval or spacing may be independently given per carrier or per CCE aggregation level. CC-specific SS configuration may be carried out by a process for determining control channel allocation. The process for determining control channel allocation may include a process for determining PDCCH allocation. By the process for determining PDCCH allocation, SS size (e.g., the number of CCEs), a CCE aggregation level of a PDCCH candidate, the location of SS, etc. may be determined. A control channel candidate contained in the CC-specific SS has a CIF field. Each CC-specific SS is configured per DL CC or per UL CC. Two or more control information formats may be established per DL CC or UL CC. In addition, a DL/UL common control information format may be established in the CC-specific SS in the same manner as in DCI formats 0/1A of LTE. The CC-specific SS configuration scheme may be based on the scheme for constructing the PDCCH search space of the legacy LTE. The control channel includes a PDCCH and the control channel candidate includes a PDCCH candidate. The control channel carries a variety of control information, and a variety of control information formats may exist according to control information types/contents.

Therefore, the base station (BS) transmits a control channel of a specific UE through a plurality of CC-specific SSs in step S920. In this example, the plurality of CC-specific SSs may be transmitted through the same subframe on the same carrier. In more detail, the plurality of CC-specific SSs is transmitted through a control region (that is, a maximum of 3 (or 4) contiguous OFDM symbols indicated by PCFICH) within the subframe. The control channel (or control information) may carry identification (ID) information to indicate the corresponding UE. The ID information includes RNTI (e.g., C-RNTI, SPS-RNTI, and the like). The control channel (or control information) may be scrambled using such identification information. For example, the base station (BS) can transmit a PDCCH that is CRC-scrambled with C-RNTI, to the UE.

Figure 10:
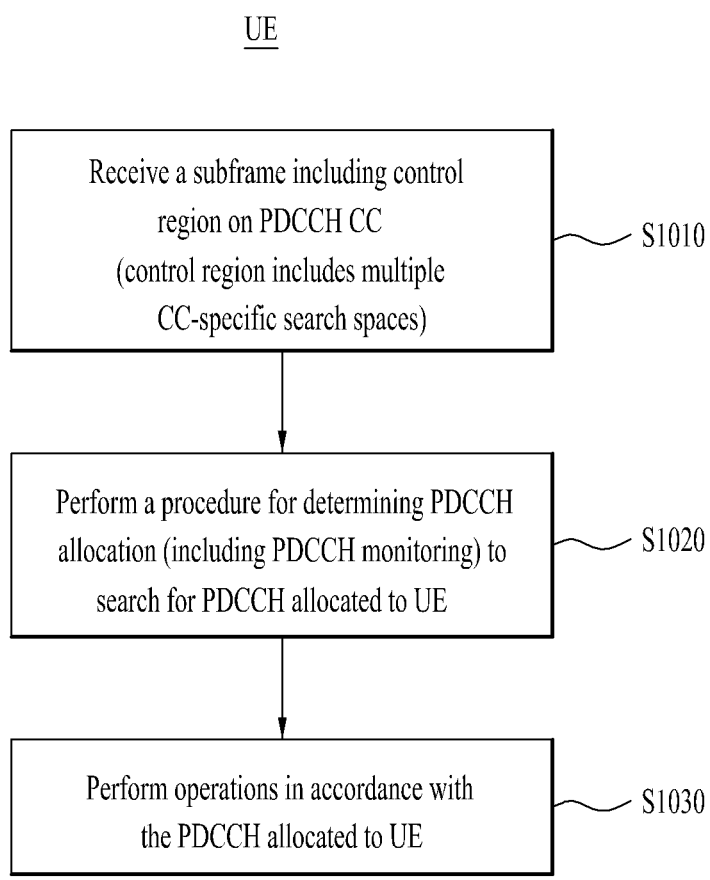
FIG. 10 is a conceptual diagram illustrating a method for processing a control channel (e.g., PDCCH) by a user equipment (UE).

FIG. 10 shows an example of processing a control channel (PDCCH) by a UE. Steps shown in FIG. 10 may correspond to those of FIG. 9, and as such, for a detailed description thereof, reference can be made to the contents of FIG. 9.

Referring to FIG. 10, the UE receives a subframe including a control region on a PDCCH CC in step S1010. The control region includes a plurality of CC-specific SSs. Each SS includes a set of control channel candidates. In this example, the CC-specific search spaces are concatenated with a specific interval therebetween. The control channel candidate contained in the plurality of CC-specific SSs has a CIF field. Each CC-specific SS is configured per CC.

Thereafter, in order to search for a control channel assigned to the UE, the UE performs a process for determining control channel (e.g., PDCCH) allocation in step S1020. The process for determining control channel allocation may include a process for monitoring control channel candidates contained in the search space in consideration of various parameters (e.g., SS size (e.g., the number of CCEs), CCE aggregation level of the control channel candidate, SS position, etc.) obtained by a predetermined rule in step S1020. The monitoring process may include a process of performing blind decoding (BD) of each control channel candidate. Thereafter, the UE may carry out the operations of a control channel assigned thereto in step S1030.

In this case, a specific spacing between CC-specific SSs is given by an SS offset. The SS offset (simply, called an offset) includes an offset between SSs (i.e., spacing between contiguous CC-specific SSs) or an SS-specific offset (i.e., spacing between one common reference point and the corresponding CC-specific SS). The SS offset may have a value in units of a PDCCH candidate or a value in units of a CCE. In addition, the SS offset including "0" (i.e., no offset) may have a random value per subframe or be given as a CIF function (i.e., a CIF-based offset). In addition, the SS offset may have a fixed value for all subframes. The SS offset is properly configured so that the overlap between CC-specific SSs may be scattered or minimized.

Meanwhile, the number of PDCCH candidates or CCE resources capable of being used as a UE-specific SS for a CCE aggregation level (L) may be changed according to a variety of variables (i.e., bandwidth of PDCCH CC, number of Tx antennas of PDCCH CC, CFI value allocated through a PCFICH of a PDCCH CC). When configuring a CC-specific SS on a PDCCH CC, the SS offset is semi-statically or dynamically established in consideration of the number of available PDCCH candidates (being semi-statically/dynamically changed according to the above-mentioned variables) and the number of scheduled CCs, such that the overlap between CC-specific SSs of one UE is scattered/minimized, resulting in increased scheduling freedom for each UE/CC.

In more detail, in the case of a random offset, a weight added to a random offset is differently established according to the number of PDCCH candidates/CCEs (or a bandwidth of PDCCH CC, the number of Tx antennas, and CFI value), and the number of scheduled CCs. Alternatively, a sampling range capable of generating a random offset may be differently established (for example, if a random offset is generated in the range of $0 \leq \text{offset} \leq N$, N may be differently established). In the case of a CIF-based offset or a fixed offset, the offset size may be differently established according to the number of available PDCCH candidates/CCEs (or bandwidth of PDCCH CC, number of Tx antennas, CFI value) and the number of scheduled CCS, or a weight to be added to an offset may be differently established.

Specifically, the offset between CC-specific SSs may be semi-statically or dynamically established according to the number of scheduled CCs changed not only by CC activation/deactivation through L1/L2 signaling but also by the PDCCH CC-scheduled CC linkage configuration through RRC signaling. For example, when the number of scheduled CCs is reduced, a weight added to an offset may be higher than a previous weight; or when a random offset may be generated in a wider sampling range (for example, if a random offset is generated in the range of $0 \leq \text{offset} \leq N$, N may be increased), the offset may be generated at random. If the number of scheduled CCs is reduced, an offset value may be reconfigured as a value higher than a previous value in the case of a CIF-based offset or a fixed offset. In an opposite example, when the number of scheduled CCs of a PDCCH CC is increased, a weight added to an offset under a random offset is set to a weight lower than a previous value, or an offset can be generated at random in the sampling range smaller than a previous range (for example, if a random offset is generated in the range of $0 \leq \text{offset} \leq N$, N is reduced). In addition, provided that the number of scheduled CCs of a PDCCH CC is increased, in the case of a CIF-based offset or a fixed offset, an offset may be reconfigured to be a value lower than a previous value (alternatively, a value to which a weight lower than a previous value is added) lower than a previous value in the case of a CIF-based offset or a fixed offset. In this case, the above-mentioned weight may be a function value indicating the number of scheduled CCs.

More specifically, the UE may dynamically establish the offset between CC-specific SSs according to a CFI value detected through a PCFICH at every subframe. For convenience of description and better understanding of the present invention, it is assumed that a CFI value of a current subframe is higher than that of a previous subframe. Under this condition, in the case of a random offset, a weight applied to an offset is higher than that of a previous subframe, or an offset can be randomly generated in the range larger than that of a previous subframe. In the case of a CIF-based offset or a fixed offset, an offset may be reconfigured as a value higher than that of a previous subframe (alternatively, a value to which a weight higher than that of a previous subframe is applied). In an opposite example, it is assumed that a CFI value of a current subframe is lower than that of a previous subframe. Under this condition, in the case of a random offset, a weight applied to an offset is lower than that of a previous subframe, or an offset can be randomly generated in the range smaller than that of a previous subframe. In the case of a CIF-based offset or a fixed offset, an offset may be reconfigured as a value lower than that of a previous subframe is added). In this case, the weight may be a CFI value or a CFI function value.

Figure 11:
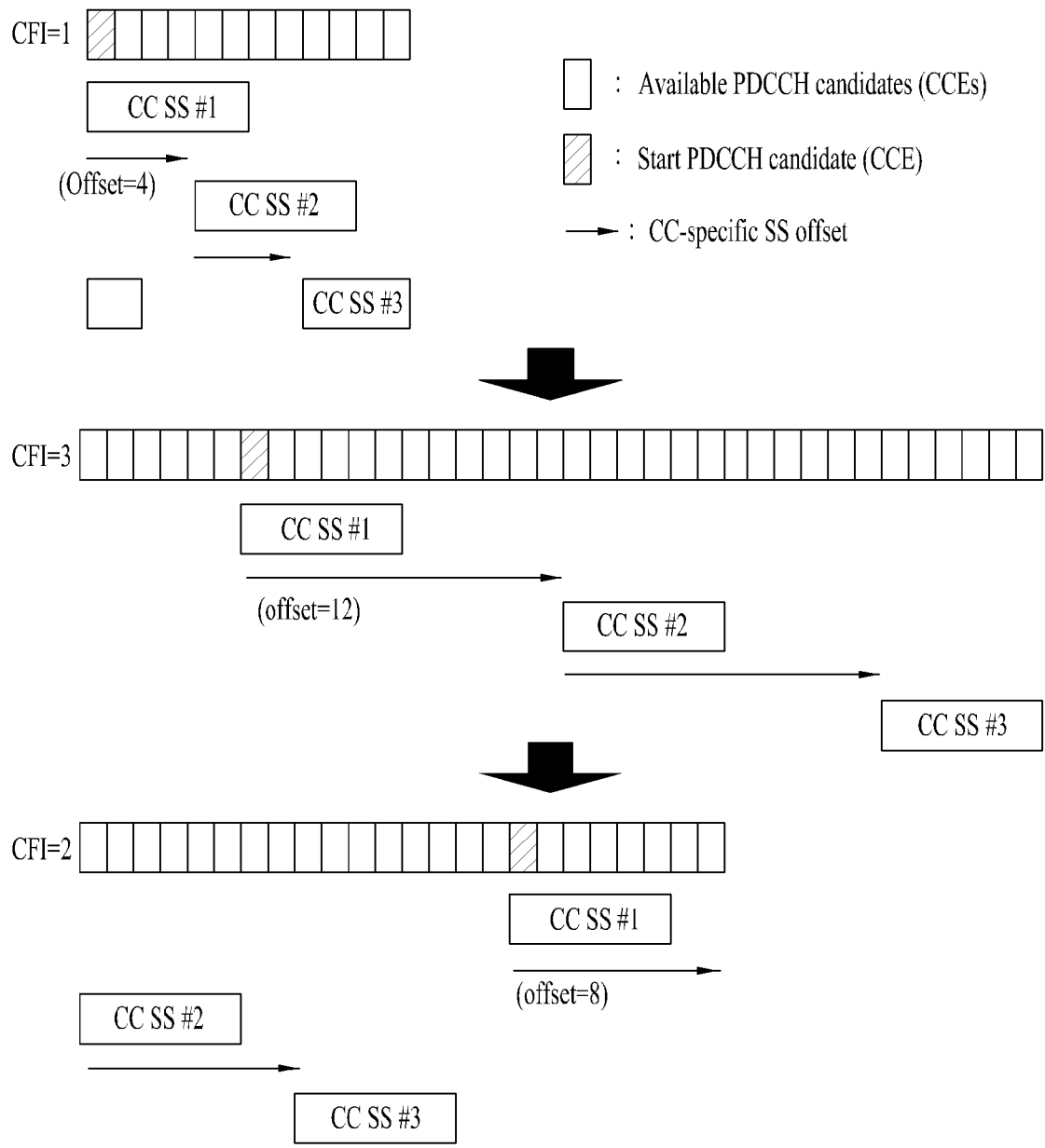

FIGS. 11 and 12 illustrate CC-specific SS configuration according to one embodiment of the present invention. FIGS. 11 and 12 illustrate a method for constructing a CC-specific SS according to a CFI value of a PDCCH CC and the number of scheduled CCs. In FIG. 11, under the condition that the number of scheduled CCs is kept at 3, the CFI value of PDCCH CC is changed in the order of 1→3→2 as an example. FIG. 12 exemplarily shows that the number of scheduled CCs of PDCCH CC (CC#1) is changed from 3 to 2 (CC #1, CC #2, CC #3→CC #1, CC #2). For convenience of description, the examples of FIGS. 11 and 12 assume that the same spacing (i.e., a fixed offset) between CC-specific SSs is established. In addition, the CCE aggregation level of L=1 (i.e., 1 PDCCH candidate=1 CCE) is disclosed only for illustrative purposes, a common start point of the CC-specific SSs is aligned to a start point of an SS for a PDCCH CC (CC #1). Each CC-specific SS is composed of 6 PDCCH candidates (in the same manner as in LTE). Referring to Table 3, in the case of LTE, the numbers of PDCCH candidates at L=1, L=2, L=4, and L=8 are given as 6, 6, 2, and 2, respectively.

Referring to FIGS. 11 and 12, since a CFI value of PDCCH CC (CC #1) is changed in the order of 1→3→2 under three scheduled CCs exist, the offset between CC-specific SSs may be reconfigured as 4 PDCCH candidates→12 PDCCH candidates→8 PDCCH candidates (8 CCEs). That is, as can be seen from FIGS. 11 and 12, the offset between CC-specific SSs in a current subframe is increased or decreased (e.g., is proportional to CFI) in consideration of the CFI value of the corresponding subframe, such that the overlap between CC-specific SSs can be dynamically scattered or minimized. In addition, assuming that the number of scheduled CCs of PDCCH CC (CC #1) is changed from 3 to 2, although the CFI value is equally set to 1, the offset between CC-specific SSs may be reconfigured as 4 PDCCH candidates (4 CCEs)→6 PDCCH candidates (6 CCEs).

The offset shown in FIGS. 11 and 12 shows spacing between two neighboring CC-specific SSs. That is, the offset shown in FIGS. 11 and 12 shows an offset between CC-specific SSs, for example, a difference between start CCE indices. However, the above-mentioned description is disclosed only for illustrative purposes, and the offset may also be represented by a spacing (i.e., an offset between CC-specific SSs) (e.g., a difference between start CCE indices) between a CC-specific SS for a PDCCH CC and another CC-specific SS.

When constructing a UE-specific SS in a subframe of a PDCCH CC, the present invention provides a method ("max-dist-offset") for establishing an offset value for each CC-specific SS in such a manner that the spacing between CC-specific SSs is maximized. The present invention may be independently applied to each CCE aggregation level, and may be equally applied to a plurality of CCE aggregation levels.

In more detail, the offset for each CC-specific SS may be configured in a manner that the spacing between contiguous CC-specific SSs is maximized considering the number of available PDCCH candidates, the number of available CCEs, and the number of available scheduled CCs within a subframe of the corresponding PDCCH CC. In more detail, considering $\lfloor N_{CCE,k}/L \rfloor$ (or $N_{CCE,k}$) and the number of scheduled CCs or an associated parameter $N_{sch-CC}$ for use in a PDCCH CC, and the offset value for CC-specific SS may be established is such a manner that the spacing between contiguous CC-specific SSs for each CCE aggregation level is maximized. $N_{sch-CC}$ is the number of scheduled CCs established in PDCCH CC, and may be replaced with either a maximum value from among CIF values of the scheduled CC or a maximum value from among CIF function values f(CIF). Preferably, the same offset value between CC-specific SSs may be applied to a plurality of CCE aggregation levels. That is, the spacing between contiguous CC-specific SSs for each CCE aggregation level may be identical to the spacing between contiguous CC-specific SS start points as necessary. The concept shown in FIGS. 11 and 12 may be used as an example of the "max-dist-offset" method proposed by the present invention.

Equation 3 shows an exemplary method for calculating a CCE index corresponding to an m-th PDCCH candidate of each CC-specific SS using the "max-dist-offset" method.

$$L \cdot \{(Y_k + O_{c,k}^{(L)} + m) \bmod \lfloor N_{CCE,k}/L \rfloor\} + i \quad \text{[Equation 3]}$$

In equation 3, L is a CCE aggregation level, $Y_k$ is a reference point at a subframe (k), $O_{c,k}^{(L)}$ is an offset for a scheduled carrier (e.g., CC) "c" at a CCE aggregation level (L), m is denoted by m=0, ..., $M^{(L)}-1$, $M^{(L)}$ is the number of PDCCH candidates to be monitored in the corresponding search space, $N_{CCE,k}$ is the number of CCEs contained in a control region of the subframe (k), and i is denoted by i=0, ..., L−1. The index (c) of the scheduled carrier (e.g., CC) may be replaced with a CIF value of the scheduled carrier (e.g., CC) or a CIF function value ƒ(CIF).

The offset value $O_{c,k}^{(L)}$ is represented by the following equation 4.

$$O_{c,k}^{(L)} = c \cdot \lfloor N_{CCE,k}/(L \cdot N_{sch-CC}) \rfloor \quad \text{[Equation 4]}$$

In Equation 4, $N_{sch-CC}$ is the number of scheduled CCs established in a PDCCH CC. $N_{sch-CC}$ can be replaced with either a maximum value from among CIF values of the scheduled CC or a maximum value from among CIF function values ƒ(CIF). The index (c) of the scheduled carrier (e.g., CC) can be replaced with a CIF value of the scheduled carrier (e.g., CC) or a CIF function value ƒ(CIF).

In addition, when using the CC-offset-SS scheme, the above-mentioned "max-dist-offset" method is applied to a plurality of CCE aggregation levels, and the CC-specific SSs are consecutively configured (e.g., are consecutively configured at the CCE index) in the remaining CCE aggregation levels, such that a method for establishing the offset value between CC-specific CCs ("consecutive-offset") may be used. Preferably, "max-dist-offset" $O_{c,k}^{(L)}$ for one or more CCE aggregation levels is determined as shown in Equation 4, and "consecutive-offset" $O_{c,k}^{(L)}$ for the remaining CCE aggregation levels can be determined as shown in Equation 5.

$$O_{c,k}^{(L)} = c \cdot M^{(L)} \quad \text{[Equation 5]}$$

In Equation 5, the scheduled CC index (c) may be replaced with a CIF value of the scheduled carrier (e.g., CC) or a CIF function value f(CIF).

In addition, an offset value ($O_F$) between CC-specific SSs is given at a specific CCE aggregation level ($L_F$), and a method for applying the offset between CC-specific SSs having the same CCE number as the size of $O_F$ size at the remaining CCE aggregation levels may be used. That is, the offset value for use in all CCE aggregation levels has the same CCE number. In this Case $O_F$ may be a promised value between the base station (BS) and the UE, or is semi-statically established through RRC signaling from the base station (BS). Alternatively, $O_F$ may be dynamically calculated in consideration of $\lfloor N_{CCE,k}/L_F \rfloor$ (or $N_{CCE,k}$) and the number $N_{sch-CC}$ of scheduled CCs. In more detail, $O_F$ is an offset value for $L_F=1$ (or $L_F=8$). In addition, $O_F$ may be given as a "max-dist-offset" value at which the spacing between contiguous CC-specific SSs is maximized. For example, according to Equation 4, $O_F$ may be given as $c \cdot \lfloor N_{CCE,k}/(L_F \cdot N_{sch-CC}) \rfloor$. In addition, $O_F$ may be given as the "consecutive-offset" value in which CC-specific SSs are consecutively configured (for example, in Equation 5, $O_F$ is given as $c \cdot M^{(L_F)}$).

As a specific example of the above proposed method, the offset between CC-specific SSs at the CCE aggregation level ($L_F$=8) is given as "consecutive-offset" (i.e., $O_F$=$M^{(8)}$=2 (16 CCEs)), and the offset between CC-specific SSs at the remaining CCE aggregation levels L=1, L=2 and L=4 may have the same number of CCEs (i.e., 16 CCEs) ("constant-offset") identical to the size of $O_F$.

The offset is generalized as shown in Equation 6.

$$O_{c,k}^{(L)} = c \cdot 16/L \qquad \text{[Equation 6]}$$

In Equation 6, $O_{c,k}^{(L)}$ is an offset in units of a PDCCH candidate. "c" is an index of the scheduled carrier (e.g., CC), and may be replaced with a CIF value of the scheduled carrier (e.g., CC0 or a CIF function value f(CIF)).

In accordance with the above-mentioned scheme, the offset having the same number of CCEs is applied to all CC-specific SSs irrespective of the CCE aggregation level, such that the above-mentioned scheme can be simply operated. In contrast, under a specific situation (e.g., a specific combination ($N_{sch-CC}$, $N_{CCE,k}$)), a CC-specific SS is unnecessarily wrap-around processed in CCE resources, such that overlap between CC-specific SSs may occur. For example, when $N_{sch-CC}$=3 (c=0, 1, 2) and $N_{CCE,k}$=32, SSs of CC #0 and CC #2 are fully overlapped with all CCE aggregation levels.

Therefore, when using the "constant-offset" method, the "constant-offset" value may be changed according to some conditions, or the offset decision method can be differently determined according to some conditions. The conditions may be associated with $N_{CCE,k}$ and/or $N_{sch-CC}$. For example, the conditions may be associated with $\lfloor N_{CCE,k}/N_{sch-CC} \rfloor$ or $\lfloor N_{CCE,k}/(L \cdot N_{sch-CC}) \rfloor$.

In more detail, according to the above-mentioned "constant-offset" method, in association with a subframe including the ($N_{CCE,k}$, $N_{sch-CC}$) combination in which SSs of a specific or some or all CCE aggregation levels are wrap-around processed in the entire CCE resource, the following methods i) to iii) can be considered for specific or some or all CCE aggregation levels. In Method (i), the "constant-offset" value may be changed. In Method (ii), the "max-dist-offset" method may be used. In Method (iii), the "consecutive-offset" method may be used. In more detail, according to the above-mentioned "constant-offset" method, the following methods i) to iii) can be used according to the $\lfloor N_{CCE,k}/(L \cdot N_{sch-CC}) \rfloor$ value. In Method (i), the "constant-offset" value may be changed (See Equation 7). In Method (ii), the "constant-offset" method or the "max-dist-offset" method can be selectively used (See Equation 8 or 9). In Method (iii), the "constant-offset" method or the "consecutive-offset" method can be selectively used (See Equation 10 or 11).

$$O_{c,k}^{(L)} = c \cdot \min(2, \lfloor N_{CCE,k}/(8 \cdot N_{sch-CC}) \rfloor) \cdot 8/L \qquad \text{[Equation 7]}$$

In Equation 7, $O_{c,k}^{(L)}$ can be given by the "max-dist-offset" method on the assumption that the spacing (L) between a CC and a specific SS at all CCE aggregation levels is set to 8 (i.e., L=8). However, the upper limit of the spacing between the CC and the specific SS is limited to 16/L PDCCH candidates (i.e., 16 CCEs).

$$O_{c,k}^{(L)} = c \cdot \min(16/L, \lfloor N_{CCE,k}/(L \cdot N_{sch-CC}) \rfloor) \qquad \text{[Equation 8]}$$

In Equation 8, the spacing between a CC and a specific SS at all CCE aggregation levels is given by the "max-dist-offset" method on the basis of an actual L value. However, the upper limit of the spacing between the CC and the specific SS is limited to 16/L PDCCH candidates (i.e., 16 CCEs).

$$O_{c,k}^{(L)} = \begin{cases} c \cdot 16/L & \text{if } \left\lfloor \dfrac{N_{CCE,k}}{(L \cdot N_{sch-CC})} \right\rfloor > M^{(L)} \\ c \cdot \left\lfloor \dfrac{N_{CCE,k}}{(L \cdot N_{sch-CC})} \right\rfloor & \text{if } \left\lfloor \dfrac{N_{CCE,k}}{(L \cdot N_{sch-CC})} \right\rfloor > M^{(L)} \end{cases} \qquad \text{[Equation 9]}$$

In Equation 9, the spacing between a CC and a specific SS at all CCE aggregation levels is given by the "max-dist-offset" method on the basis of an actual L value. However, if the spacing between a CC and a specific SS at each CCE aggregation level is larger than the number of PDCCH candidates of the CC-specific SS at the corresponding CCE aggregation level, the spacing between the CC and the specific SS is fixed to 16/L PDCCH candidates (i.e., 16 CCEs).

$$O_{c,k}^{(L)} = \begin{cases} c \cdot 16/L & \text{if } \left\lfloor \dfrac{N_{CC,k}}{(8 \cdot N_{sch-CC})} \right\rfloor \geq 2 \\ c \cdot M^{(L)} & \text{if } \left\lfloor \dfrac{N_{CCE,k}}{(8 \cdot N_{sch-CC})} \right\rfloor < 2 \end{cases} \qquad \text{[Equation 10]}$$

In Equation 10, the spacing between a CC and a specific SS at all CCE aggregation levels is given by the "consecutive-offset" method. However, if the spacing between the CC and the specific SS according to the "max-dist-offset" method on the basis of a specific value (L=8) at each CCE aggregation level is equal to or greater than 2 PDCCH candidates, the spacing between the CC and the specific SS is fixed to 16/L PDCCH candidates (i.e., 16 CCEs).

$$O_{c,k}^{(L)} = \begin{cases} c \cdot 16/L & \text{if } \left\lfloor \dfrac{N_{CCE,k}}{(8 \cdot N_{sch-CC})} \right\rfloor > M^{(L)} \\ c \cdot M^{(L)} & \text{if } \left\lfloor \dfrac{N_{CCE,k}}{(L \cdot N_{sch-CC})} \right\rfloor \leq M^{(L)} \end{cases} \qquad \text{[Equation 11]}$$

In Equation 11, the spacing between a CC and a specific SS at all CCE aggregation levels is given by the "consecutive-offset" method. However, if the spacing between the CC and the specific SS according to the "max-dist-offset" method on the basis of an actual L value at each CCE aggregation level is equal to or greater than the number of PDCCH candidates of a CC-specific SS at the corresponding CCE aggregation level, the spacing between the CC and the specific SS is fixed to 16/L PDCCH candidates (i.e., 16 CCEs).

In Equations 7 to 11, $O_{c,k}^{(L)}$, c, $N_{CCE,k}$, $N_{sch-CC}$, L, $M^{(L)}$, min(A,B) and $\lfloor \; \rfloor$ are equal to those of the above-mentioned description. In more detail, $O_{c,k}^{(L)}$ is an offset denoted in units of a PDCCH candidate. c acting as an index of a scheduled carrier (e.g., CC) may be replaced with a CIF value or a CIF function f(CIF) of the scheduled carrier (e.g., CC).

In another example, the offset ($O_F$) between a CC and a specific SS is given at a specific CCE aggregation level ($L_F$), and a method for determining the offset between a CC and a specific SS at the remaining CCE aggregation levels as a relative value of the offset value ($O_F$) may be used. In this case, assuming that a parameter for deciding the offset value at the remaining CCE aggregation level is defined as $\alpha_L$, the offset value at the corresponding CCE aggregation level may be determined to be $O_F + \alpha_L$ ($L \neq L_F$). Similarly, if a reference offset value $O_S$ is given, the offset value between a CC and a specific SS at all CCE aggregation levels can be determined to be a relative value of the offset value $O_S$. In this case, assuming that the parameter for determining the offset value at each CCE aggregation level is defined as $\alpha_L$, the offset value at the corresponding CCE level can be determined to be $O_S+\alpha_L$ (L=1, 2, 4, 8). In this case, $O_F$ and/or $O_S$ may be decided between the BS (or eNB) and the UE, may be semi-statically established through RRC signaling from the eNB, or may be dynamically calculated according to $\lfloor N_{CCE,k}/L_F \rfloor$ (or $N_{CCE,k}$) and the number of scheduled CCs or an associated parameter $N_{sch\text{-}CC}$. In addition, $O_F$ and/or $O_S$ may be an offset value for $L_F$=1 (or $L_F$=8). Preferably, $O_F$ and/or $O_S$ may be given as the offset value using the "max-dist-offset" method (for example, as can be seen from Equation 4, given as $c\cdot\lfloor N_{CCE,k}/(L_F \cdot N_{sch\text{-}CC})\rfloor$). Alternatively, $O_F$ and/or $O_S$ are given as an offset value to which the consecutive-offset method is applied (for example, as can be seen from Equation 5, given as $c\cdot M^{(L_F)}$). More specifically, the offset value between a CC and a specific SS at a CCE aggregation level corresponding to relative values of $O_F$ and $O_S$ can be differently determined according to $\lfloor N_{CCE,k}/L \rfloor$ (or $N_{CCE,k}$) and $N_{sch\text{-}CC}$. Specifically, as the L value increases, the position of a CC-specific SS can be increased or reduced in units of a PDCCH candidate/CCE on the basis of $O_F$ and/or $O_S$. As a result, the spacing between a CC and a specific SS can be differently established at different CCE aggregation levels, such that CC-specific SS overlap between different UEs scheduled at different CCE aggregation levels can be reduced. In the above-mentioned schemes/equations, the scheduled CC index (c) may be replaced with a CIF value of the corresponding CC or the CIF function value f(CIF). For example, when all CCs allocated to a UE are sorted in ascending or descending numerical order of CIF value, c may be an index corresponding to the CC order (c= 0, ..., $N_{sch\text{-}CC}$−1). In addition, in the above-mentioned schemes/equations, $N_{sch\text{-}CC}$ may be a maximum number of CCs capable of being aggregated by the corresponding UE, the number of scheduled CCs established in a PDCCH CC, a maximum number of CCs deployed in the cell, or a maximum number of CCs defined by a system. $N_{sch\text{-}CC}$ may be replaced with a maximum value among CIF values or CIF function values $f$(CIF) of the scheduled CC.

Figure 13:
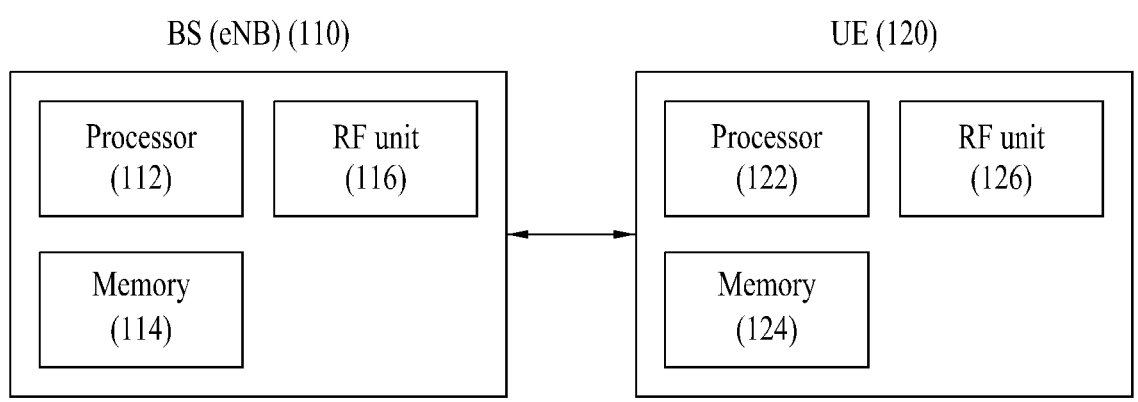
FIG. 13 is a block diagram illustrating a base station (BS) and a user equipment (UE) applicable to the embodiments of the present invention.

FIG. 13 is a block diagram illustrating a BS (eNB) and a UE applicable to the embodiments of the present invention.

Referring to FIG. 13, the wireless communication system includes a base station (BS) 110 (also denoted by 'eNB') and a UE 120. The BS 110 includes a processor 112, a memory 114, and a radio frequency (RF) unit 116. The processor 112 may be constructed to implement the procedures and/or methods disclosed in the embodiments of the present invention. The memory 114 may be connected to a processor 112, and store various information related to operations of the processor 112. The RF unit 116 is connected to the processor 112, and transmits and/or receives RF signals. The UE 120 includes a processor 122, a memory 124, and an RF unit 126. The processor 122 may be constructed to implement the procedures and/or methods disclosed in the embodiments of the present invention. The memory 124 may be connected to a processor 122, and store various information related to operations of the processor 122. The RF unit 126 is connected to the processor 122, and transmits and/or receives RF signals. The BS 110 and/or the UE 120 may include a single antenna or multiple antennas.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment my be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Exemplary embodiments of the present invention can be applied to wireless communication systems such as a UE, a relay node (RN), and a BS (or eNB).

The invention claimed is:
1. A method for receiving a physical downlink control channel (PDCCH) by a user equipment (UE) in a wireless communication system supporting multiple carriers, the method comprising:

receiving a plurality of search spaces through a control region of a subframe, wherein each search space includes a plurality of PDCCH candidate sets and corresponds to each carrier; and monitoring PDCCH candidates for the PDCCH in the plurality of search spaces, wherein a search space $S_k^{(L)}$ corresponding to a single carrier of the plurality of search spaces contains a plurality of control channel elements (CCEs) in a subframe k at a carrier aggregation level L, wherein for the single carrier on which a PDCCH candidate (m) of the PDCCH candidates is monitored, a CCE index corresponding to the PDCCH candidate (m) within the search space $S_k^{(L)}$ is determined by the following equation A:

$$L \cdot \{(Y_k + O_{c,k}^{(L)} + m) \bmod \lfloor N_{CCE,k}/L \rfloor\} + i \quad \text{(Equation A)}$$

where L is a carrier aggregation level, $Y_k$ is the reference point at a subframe (k), m is denoted by m=0, ..., $M^{(L)}$−1, $M^{(L)}$ is a number of PDCCH candidates to be monitored in the corresponding search space, $N_{CCE,k}$ is a number of CCEs contained in a control region of the subframe (k), and i is denoted by i=0, ..., L−1, and $O_{c,k}^{(L)}$ is determined by the following equation B:

$$O_{c,k}^{(L)} = c \cdot M^{(L)} \quad \text{(Equation B)}$$

where c is a value of carrier indication field (CIF) related to the single carrier.

2. A user equipment (UE) configured to receive a physical downlink control channel (PDCCH) in a wireless communication system supporting multiple carriers, the user equipment (UE) comprising:

a radio frequency (RF) unit; and a processor, wherein the processor is configured to receive a plurality of search spaces through a control region of a subframe, and to monitor PDCCH candidates for the PDCCH in the plurality of search spaces, wherein a search space $S_k^{(L)}$ corresponding to a single carrier of the plurality of search spaces contains a plurality of control channel elements (CCEs) in a subframe k at a carrier aggregation level L, wherein for the single carrier on which a PDCCH candidate (m) of the PDCCH candidates is monitored, a CCE index corresponding to the PDCCH candidate (m) within the search space $S_k^{(L)}$ is determined by the following equation A:

$$L \cdot \{(Y_k + O_{c,k}^{(L)} + m) \bmod \lfloor N_{CCE,k}/L \rfloor\} + i \quad \text{(Equation A)}$$

where L is a carrier aggregation level, $Y_k$ is the reference point at a subframe (k), m is denoted by m=0, ..., $M^{(L)}$−1, $M^{(L)}$ is a number of PDCCH candidates to be monitored in the corresponding search space, $N_{CCE,k}$ is a number of CCEs contained in a control region of the subframe (k), and i is denoted by i=0, ..., L−1, and $O_{c,k}^{(L)}$ is determined by the following equation B:

$$O_{c,k}^{(L)} = c \cdot M^{(L)} \quad \text{(Equation B)}$$

where c is a value of carrier indication field (CIF) related to the single carrier.

\* \* \* \* \*